(12) United States Patent
Kind et al.

(10) Patent No.: US 9,781,010 B2
(45) Date of Patent: Oct. 3, 2017

(54) MANAGING REMOTE DEVICES

(71) Applicant: International Business Machines Corporation, Armonk, NY (US)

(72) Inventors: Andreas Kind, Beijing (CN); Peini Liu, Beijing (CN); Tian Cheng Liu, Beijing (CN); Ke Wei Sun, Beijing (CN); Lin Yang, Beijing (CN); Tao Yu, Beijing (CN); Zhang Yu, Beijing (CN); Yu Zhang, Beijing (CN); Xiao Zhong, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 442 days.

(21) Appl. No.: 14/014,459

(22) Filed: Aug. 30, 2013

(65) Prior Publication Data

US 2014/0068048 A1    Mar. 6, 2014

(30) Foreign Application Priority Data

Aug. 31, 2012   (CN) .......................... 2012 1 0320842

(51) Int. Cl.
*H04L 12/24* (2006.01)
*H04L 12/26* (2006.01)

(52) U.S. Cl.
CPC .......... *H04L 41/32* (2013.01); *H04L 41/0879* (2013.01); *H04L 43/0817* (2013.01)

(58) Field of Classification Search
CPC ............. G06F 11/3086; G06F 11/3055; G06F 11/3058
See application file for complete search history.

(56) References Cited

U.S. PATENT DOCUMENTS 7,689,394 B2    3/2010   Furem et al.
8,060,605 B1    11/2011  Manuilov et al.
(Continued)

FOREIGN PATENT DOCUMENTS

CN      102523271 A      6/2012
CN      102577307 A      7/2012
WO      WO 2011/038032 A2   3/2011

OTHER PUBLICATIONS

Marc S. Kolaks, Securing out-of-band device management, SANS Institute, 2003.
Chinese Office Action dated May 5, 2016.

*Primary Examiner* — Oleg Survillo
*Assistant Examiner* — Christopher Cadorna
(74) *Attorney, Agent, or Firm* — Mercedes L. Hobson, Esq.; McGinn IP Law Group, PLLC (57) ABSTRACT

A method and apparatus for managing remote devices. In one embodiment of the present invention, there is provided a method of managing a remote device, comprising: obtaining a first identifier based on a name sequence in state information of the remote device, the first identifier being for indicating a template that provides the state information; obtaining a second identifier based on a numerical value sequence in the state information; sending a state access notification that comprises at least the first identifier and the second identifier; and providing the state information based on the first identifier and the second identifier in response to having received a result of activating the state access notification. In one embodiment of the present invention, there is provided an apparatus for managing a remote device.

15 Claims, 7 Drawing Sheets

(56) References Cited

U.S. PATENT DOCUMENTS

| | | |
|---|---|---|
| 8,195,146 B2 | 6/2012 | Prakash et al. |
| 2006/0106802 A1* | 5/2006 | Giblin ............... G06F 17/30876 |
| 2007/0130334 A1 | 6/2007 | Carley |
| 2008/0270548 A1* | 10/2008 | Glickstein ............ G06Q 10/107 709/206 |
| 2009/0138789 A1* | 5/2009 | Tangen ............. G06F 17/30569 715/213 |
| 2010/0218110 A1* | 8/2010 | Yao ....................... G06F 9/4443 715/744 |
| 2011/0138310 A1* | 6/2011 | Gomez ................. H04L 41/082 715/769 |
| 2011/0213831 A1 | 9/2011 | Gentie et al. |
| 2011/0320585 A1* | 12/2011 | Pope ................... G06F 11/3006 709/224 |
| 2012/0079566 A1 | 3/2012 | Barranco et al. |
| 2012/0102095 A1* | 4/2012 | Campbell ........... G06F 17/3089 709/203 |
| 2012/0136961 A1 | 5/2012 | Chen et al. |
| 2012/0143970 A1* | 6/2012 | Hansen ............... G06F 11/0748 709/206 |
| 2013/0124713 A1* | 5/2013 | Feinberg ............ G06F 11/0769 709/224 |

\* cited by examiner

MANAGING REMOTE DEVICES

CROSS-REFERENCE

This application claims priority under 35 U.S.C. §119 from Chinese Patent Application No. 201210320842.6 filed Aug. 31, 2012 the entire contents of which are incorporated herein by reference.

FIELD OF THE INVENTION

Embodiments of the present invention relate to device management, and more particularly to a method, apparatus, and associated computer program product for managing a remote device.

DESCRIPTION OF THE RELATED ART

With the development of communication technology and computer technology, the automation of remote device monitoring has been implemented to a great extent. A device administrator may remotely monitor the operational state of a device through a monitoring device, such that when an abnormality occurs to the device, the device can be checked and faults can be removed via a network.

With increasingly stronger functions of a remote device, the complexity of the device has become increasingly higher. In order to comprehensively grasp the various aspects of the device, the types information that have to be monitored and the monitoring frequency have increased significantly; moreover, the number of remote devices also increases constantly while a single remote device has become increasingly more complex. For example, in application scenarios, such as a power station and building control, thousands of remote devices may be involved. The data volume of device state data as generated when monitoring these remote devices would be considerable.

In an application scenario, such as a power station, the network bandwidth used in remote device management is also limited, and upgrading these network infrastructures requires considerable investment. Additionally, if a remote management network fails, how to transfer the state information of so many remote devices through a backup communication manner with a limited data bandwidth becomes a serious concern. For example, with SMS (Short Messaging Service) only a maximum of 160 7-bit characters are allowed to transfer in each short message; therefore, it is nearly impossible to transfer various kinds of state information about the remote devices to the administrator in the SMS manner. In view of the above problems, how to more effectively transfer state data of remote devices with a limited bandwidth to a device administrator in real time needs to be addressed.

SUMMARY

There is a need for a convenient and efficient technical solution of managing remote devices that can reduce the data volume to transfer as much as possible when transferring state information of remote devices to a device administrator. Furthermore, there is a need for the device administrator to be able to view complete information about the remote devices through a simple operation. To this end, various embodiments of the present invention provide a method and apparatus for managing remote devices.

One aspect of the present invention provides a method of managing a remote device, including: obtaining a first identifier based on a name sequence in state information of the remote device, the first identifier used to indicate a template that provides the state information; obtaining a second identifier based on a numerical value sequence in the state information; sending a state access notification that includes at least the first identifier and the second identifier; and providing the state information based on the first identifier and the second identifier in response to having received a result of activating the state access notification.

According to one aspect of the present invention, obtaining a first identifier based on a name sequence in state information of the remote device includes: selecting a template corresponding to the name sequence; and setting the first identifier as an identifier of the template.

Another aspect of the present invention, provides an apparatus for managing a remote device, including: a first obtaining module configured to obtain a first identifier based on a name sequence in state information of the remote device, the first identifier indicating a template that provides the state information; a second obtaining module configured to obtain a second identifier based on a numerical value sequence in the state information; a notifying module configured to send a state access notification that includes at least the first identifier and the second identifier; and a providing module configured to provide the state information based on the first identifier and the second identifier in response to having received a result of activating the state access notification.

According to one aspect of the present invention, the first obtaining module includes: a selecting module configured to select a template corresponding to the name sequence; and a setting module configured to set the first identifier as an identifier of the template.

The method and apparatus according to the present invention may greatly reduce the data transfer volume when managing remote devices while changing the in-band communication network and out-of-band communication network of an existing remote management system as little as possible; further, they may also provide state information of the remote device to a device administrator in a simple and effective manner, thereby further removing the dependency on transfer bandwidth during the management of remote devices.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION OF PREFERRED EMBODIMENTS

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
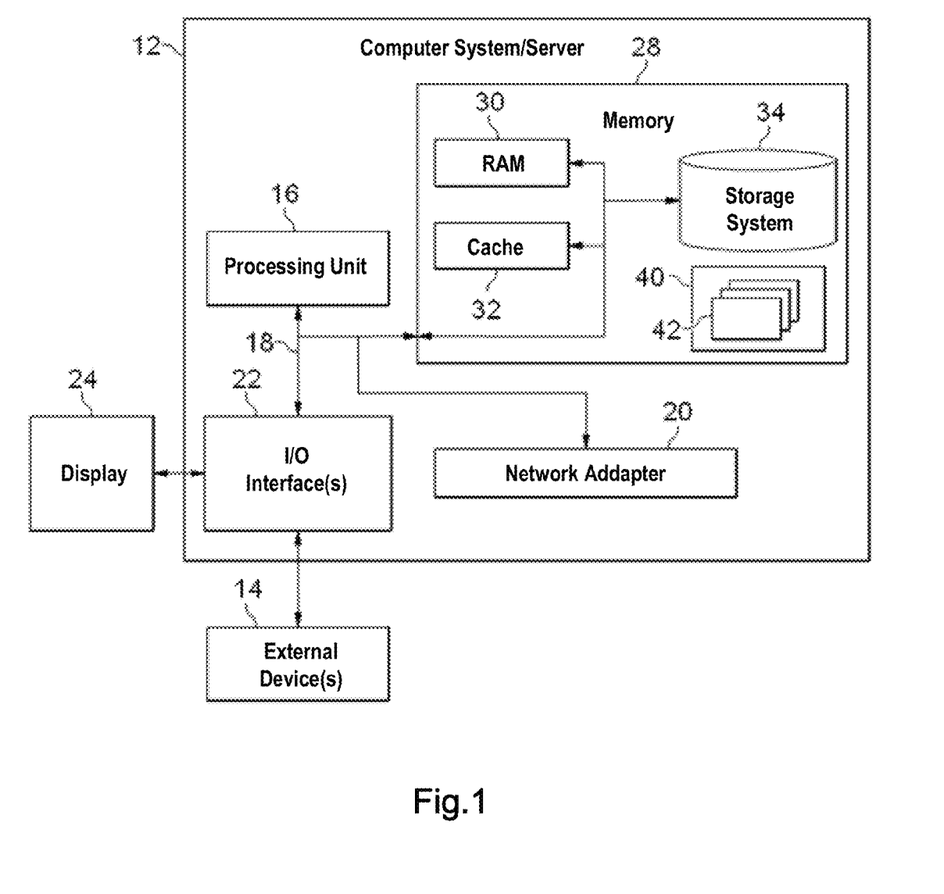
FIG. 1 illustrates a block diagram of an exemplary computer system/server 12 which is applicable to implement the embodiments of the present invention.

FIG. 1 illustrates an exemplary computer system/server 12 which is applicable to implement the embodiments of the present invention. The computer system/server 12 as illustrated in FIG. 1 is only an example, which should not construct any limitation to the functions and application scope of the embodiments of the present invention.

As illustrated in FIG. 1, the computer system/server 12 is embodied in the form of a general computing device. Components of the computer system/server 12 may include, but are not limited to, one or more processors or processing units 16, a system memory 28, and a bus 18 connecting different system components (including the system memory 28 and the processing unit 16).

The system bus 18 indicates one or more of a plurality of bus structures, including a memory bus or a memory controller, a peripheral bus, a graphic acceleration port, a processor, or a local bus using any bus structure in the plurality of bus structures. For example, the above hierarchical structures include, but are not limited to, an industrial standard architecture (ISA) bus, a MicroChannel Architecture (MAC) bus, an enhanced-ISA bus, a video electronic standard association (VESA) local bus, and a peripheral component interconnection (PCI) bus.

The computer system/server 12 typically includes various kinds of computer system-readable mediums. These mediums may be any available mediums accessible by the computer system/server 12, including volatile and non-volatile mediums, mobile and non-mobile mediums.

The system memory 28 may include a computer system readable medium in a form of volatile memory, for example, a random access memory (RAM) 30 and/or a cache memory 32. The computer system/server 12 may further include other mobile/non-mobile, volatile/non-volatile computer system storage mediums. As an example, the memory system 34 may be used to read/write a non-mobile, non-volatile magnetic medium (not illustrated in FIG. 1, generally called "a hard disk driver"). Although not illustrated in FIG. 1, a magnetic disk driver for reading/writing a mobile, non-volatile magnetic disk (for example, a "floppy disk") and an optical disk driver for reading/writing a mobile, non-volatile optical disk (for example, CD-RON, DVD-RON, or other optical medium) may be provided. In these cases, each driver may be connected to the bus 18 via one or more data medium interfaces. The memory 28 may include at least one program product that has a set (for example, at least one) program modules, and these program modules may be configured to perform the functions of various embodiments of the present invention.

A program/utility tool 40 including a set (at least one) of a program module 42 may be stored in for example the memory 28; such program module 42 includes, but is not limited to, an operating system, one or more applications, other program modules, and program data, and each of these examples or a certain combination thereof might include implementation of a network environment. The program module 42 generally executes the functions and/or methods in the embodiments as described according to the present invention.

The computer system/server 12 may also communicate with one or more peripheral devices 14 (for example, a keypad, a pointing device, a display 24, etc.), and may also communicate with one or more devices that enable the user to interact with the computer system/server 12, and/or communicate with any device (for example, network card, modem, etc.) that enables the computer system/server 12 to communicate with one or more other computing devices. Such communication may be performed via an input/output (I/O) interface 22. Moreover, the computer system/server 12 may also communicate with one or more networks (for example, a local area network (LAN), a wide area network (WAN), and/or a public network, for example, Internet). As illustrated in the figure, a network adaptor 20 communicates with other modules of the computer system/server 12 via the bus 18. It should be appreciated that although not illustrated in the figure, other hardware and/or software modules may be used in combination with the computer system/server 12, including, but not limited to, micro-code, device driver, redundancy processing unit, external disk driving array, RAID system, magnetic tape driver, and a data backup storage system, etc.

Figure 2:
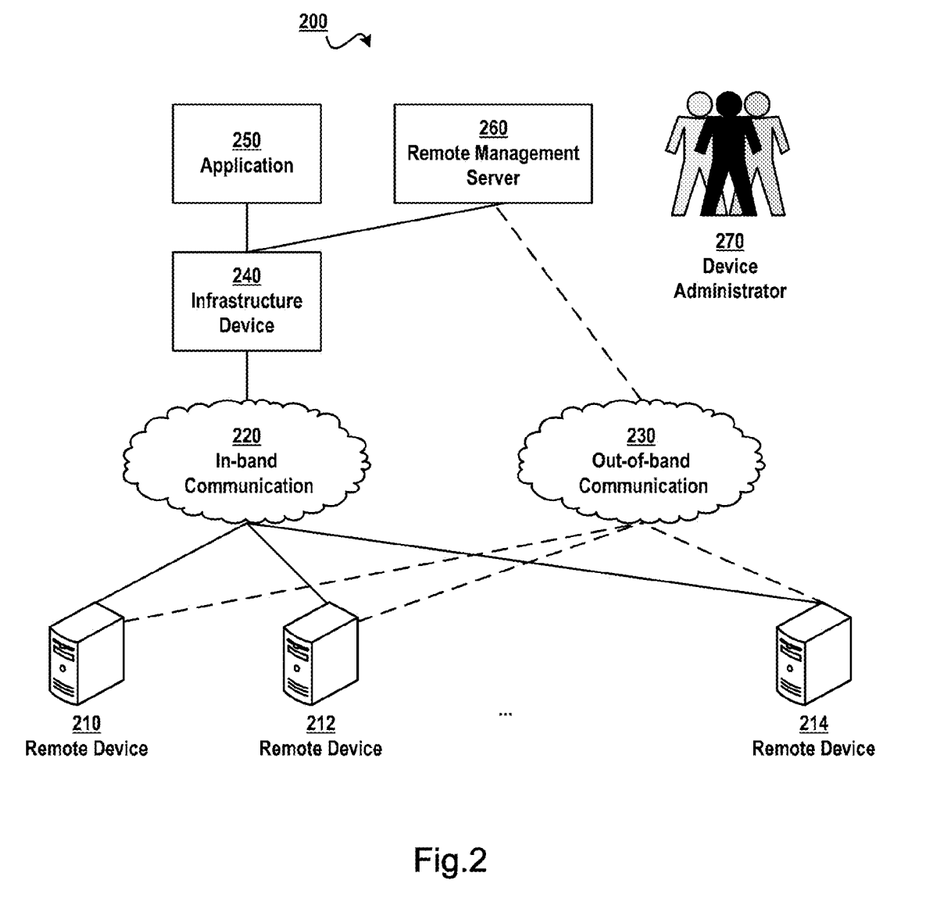
FIG. 2 illustrates a schematic diagram of an application environment of the present invention.

FIG. 2 schematically illustrates a diagram 200 of an application scenario of the present invention, wherein the application scenario 200 schematically illustrates various elements of remote device management. For example, the remote devices 210, 212, and 214 indicate the monitored objects deployed on the working site; the remote devices, for example, may be monitors in a power station or other devices in building control, etc. It should be noted that the present invention is not limited to the specific application environment, but may be applied to any application environment (for example, applied to the Internet of Things) where it is required to monitor remote devices.

Generally, there are two communication manners in remote device management, i.e., in-band communication and out-of-band communication. The so-called in-band communication generally refers to a general-service data network for remote device management (for example, wired/wireless local area network, or a part of Internet), which is used to transmit device state information and various control information, for example, a dedicated communication network in a power station. The in-band communication capacity is limited by network state; therefore, if the network fails, it would be impossible to monitor and manage the remote devices; accordingly, out-of-band communication is generally used as a supplement for in-band communication. The out-of-band communication generally refers to a communication channel independent of the in-band communication. It allows the device administrator to communicate with and manage devices using a manner independent of a remote monitoring network, for example, using a communication network irrelevant to application scenarios such as a power station, building management (for example, various services provided by a communication network operator). In the context of the present invention, only SMS is used as an example of out-of-band communication. However, the implementation of out-of-band communication is not limited thereto, which may comprise, but not limited to, a multimedia message service, email service, etc.

An infrastructure device 240 refers to various kinds of bottom-layer devices involved in providing remote device management, for example, a server, a router, etc. The application 250 refers to various kinds of specific applications implemented on the infrastructure device 240, while the remote management server 260 is the server for monitoring and managing the remote devices 210, 212, and 214 in the present invention. In FIG. 2, an in-band communication channel in an application scenario is illustrated by solid lines, and the out-of-band communication channel in the application scenario is illustrated by dotted lines. The device administrator 270 may monitor and manage the remote devices 210-214 in the in-band and out-of-band manners. It should be noted that no matter whether the in-band communication or the out-of-band communication is adopted, it is unanimously expected to merely transfer data most relevant to state information, so as to reduce the data transfer amount. It is particularly so for out-of-band data transfer.

Those skilled in the art should understand that in some cases, the state information of the remote device is generally provided in the form of a list and includes two categories: state names and numerical values of states. Table 1 below schematically illustrates an example of state information:

TABLE 1

| State Information | | |
| --- | --- | --- |
| Number | Name | Numerical Value |
| 1 | CPU Utilization Ratio | 100% |
| 2 | Memory Utilization Ratio | 29% |
| 3 | Network Interface 1 Failure | False |

It should be noted that generally the fields in the column "Numerical value" in the state information are relatively short and generally represented by an integer, a decimal, or a Boolean value; while the fields in the column "Name" are relatively long, which are generally required to be represented by a longer data length. Therefore, it may be considered to map all state names in the column "name" to a special identifier, and notify to the device administrator the special identifier together with respective numerical values in the "Numerical value" column. When the device administrator activates the notification and accesses the remote management server, the complete state information can be displayed by further displaying the data in the "Numerical value" column with a format corresponding to the special identifier. In this way, transmitting a great amount of textual information in for example the "Name" column in the state information can be avoided; thus, it may dramatically decrease the bandwidth as needed by the remote device to transmit state information (through either in-band communication or out-of-band communication).

Based on the above design principle, one embodiment of the present invention is a method of managing a remote device, including: obtaining a first identifier based on a name sequence in state information of the remote device, the first identifier used to indicate a template that provides the state information; obtaining a second identifier based on a numerical value sequence in the state information; sending a state access notification that includes at least the first identifier and the second identifier; and providing the state information based on the first identifier and the second identifier in response to receiving a result of activating the state access notification.

Figure 3:
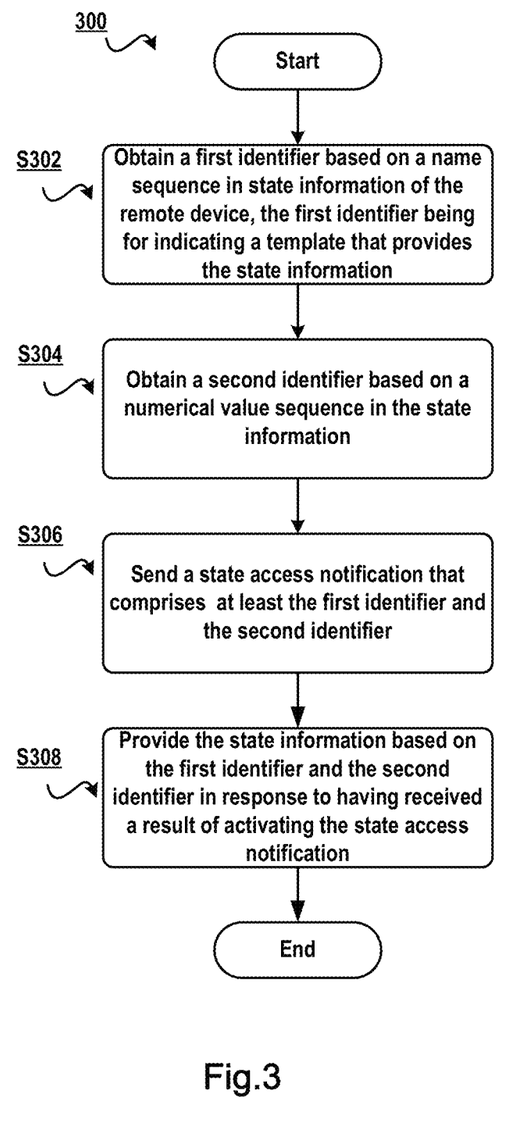
FIG. 3 schematically illustrates a flowchart of a method of managing a remote device according to an embodiment of the present invention.

Specifically, various embodiments of the present invention will be described in detail with reference to FIGS. 3-7. FIG. 3 schematically illustrates a flowchart 300 of a method of managing a remote device according to an embodiment of the present invention.

First, in step S302, a first identifier is obtained based on a name sequence in state information of a remote device, the first identifier used to indicate a template that provides the state information. As illustrated in Table 1, the "Name" column and "Numerical value" columns in the state information respectively correspond to the name sequence <CPU utilization ratio, memory utilization ratio, network interface 1 failure>, and numerical value sequence <100%, 29%, False>.

In this embodiment, a plurality of templates may be pre-stored at the remote device, and the same templates are also stored in the remote management server; each template has a unique identifier. Therefore, in the state access notification, the state information can be displayed based on the corresponding template only by transferring the identifier and numerical value content of the template. For example, the template may store the names of various states of the state information. For example, the following template as pre-stored in the remote device may act as the template for the state information as illustrated in Table 1.

T1=<CPU utilization ratio, memory utilization ratio, network interface 1 failure>.

In this example, the first identifier may be "T1" Those skilled in the art may customize the format of the template as required, for example, the data format (for example, the amount of data bits) describing the numerical value of each state may also be stored.

In step S304, the second identifier is obtained based on the numerical value sequence in the state information. Various numerical value items in the numeral value sequence correspond to various state names in the name sequence, respectively; for example, the second identifier may be constructed by a method of spacing various numerical values in the numerical value sequence with a special character (for example @). For the example illustrated in Table 1, the second identifier may be "100% @29% @False;" the second identifier may also be compressed to a shorter length by other means.

In step S306, a state access notification is sent, the state access notification including at least the first identifier and the second identifier. The state access notification may be sent via in-band communication and/or out-of-band communication. Continuing the above example, the state access notification should comprise at least the first identifier "T1" and the second identifier 100% @29% @False. A special character (for example "&") may be used to connect the first identifier and the second identifier. The state access notification here may be "T1&100% @29% @False;" a predefined sign may also be used to indicate the start of the first identifier and the start of the second identifier, respectively, for example, using "t=" as the prefix of the first identifier and "s=" as the prefix of the second identifier; at this point, the state access notification may be "t=T1&s=100% @29% @False." Those skilled in the art may also generate the state access notification by other means, as along as the first and second identifiers can be extracted from the state access notification based on the predefined algorithm when required.

In step S308, the state information is provided based on the first identifier and the second identifier in response to having received a result of activating the state access notification. It should be noted that "having received a result of activating the state access notification" is the triggering condition for providing the state information. Here, it does not matter where and how the state access notification is activated, and only the result of whether the user has activated the state access notification considered. For example, when representing the state access notification in the form of a unified resource identifier (URI), clicking on the URI at the user's mobile terminal indicates activating the access state notification; at this point, when the server detects that the URI has been accessed, it indicates "having received a result of activating the state access notification." It should be noted that the user in remote device management includes a device administrator; therefore, the present invention does not particularly distinguish between a user and a device administrator.

In one embodiment of the present invention, sending the state access notification includes sending the state access notification to the user's mobile terminal. In one embodiment of the present invention, the received result of activating the state access notification is the result of activating the state access notification at the user's mobile terminal. For example, when sending a state access represented in the form of a unified resource identifier (URI) to the user's mobile terminal using an SMS service, clicking on the URI at the mobile terminal indicates that the user activates the state access notification.

In one embodiment of the present invention, sending the state access notification includes sending the state access notification to the server. In one embodiment of the present invention, the received result of activating the state access notification is the result of activating a second notification corresponding to the state access notification. For example, the state access notification may be sent to the server, and the server generates state information associated with the state access notification and sends the second notification corresponding to the state information to the user's mobile terminal (the second notification for example may be URI and sent to the user's mobile terminal in the form of an SMS service). At this point, the user only needs to click on the URI to access the state information associated with the state access information from the server.

In the case that the first and second identifiers as extracted from the state access notification are "T1" and "100% @29% @False," respectively. Because the remote management server also stores the predefined template with a method reverse to the above method of constructing the first and second identifiers, it may be derived from "T1" that the following template could be used to display the statistical information:

T1=<CPU utilization ratio, memory utilization ratio, network interface 1 failure>.

In this embodiment, the following state information may be provided only by displaying respective numerical values in "100% @29% @False" correspondingly with respective state names in the template T1:

CPU utilization ratio=100%
Memory utilization ratio=29%
Network interface 1 failure=False It should be noted that various embodiments of the present invention do not limit when to generate the state information; the scenario of selecting a predefined template T1 based on the acquired state information has been described above; instead, the template T1 is first selected, and then, state information associated with various states such as "CPU utilization ratio, memory utilization ratio, network interface 1 failure" in template T1 is acquired from a monitoring module. Further, because the numerical value sequence in the state information of the remote device corresponds to the name sequence, and the name sequence corresponds to the content in the predefined template, obtaining the second identifier based on the numerical value sequence in the state information means obtaining the second identifier based on the template designated for the first identifier. In the case where the template further includes data format describing the numerical value of each state, obtaining the second identifier based on the numerical value sequence in the state information means obtaining the second identifier based on the template as designated for the first identifier according to the data format as defined in the template.

The above embodiment provides a method of managing a remote device using "a state access notification." Because the state information is associated with a specific remote device, the state access notification may further include device identification such as a serial number of the device. Specifically, in one embodiment of the present invention, the state access notification further includes: a third identifier for indicating device identification of the remote device. Continuing the above example, supposing the remote device ID=42 and "d=" is the prefix of the third identifier, then the state access notification may be represented as "t=T1&s=100% @29% @False&d=42." It should be noted that if the above three identifiers can be clearly distinguished, the present invention may not limit the sequence of respective identifiers, for example, the third identifier may be located in the first place.

It should be noted that the principle of the present invention is providing state data based on the first and second identifiers as included in the state access notification, i.e., displaying the numerical value sequence in the state information as included in the second identifier according to the template indicated by the first identifier. Adding "a third identifier" into the state access notification is for providing more ancillary information, which is not the essential technical feature for providing state information.

In one embodiment of the present invention, obtaining a first identifier based on a name sequence in state information of the remote device includes: selecting a template corresponding to the name sequence; and setting the first identifier as an identifier of the template.

It should be noted that different templates can be defined for different types of remote devices, and the contents of the templates should be associated with the state information to be sent to the device administrator. Based on the difference in the types of remote devices and the control objectives, a new template may also be created or an existing template may be updated as required. For example, when the state information of another remote device that needs to be monitored is illustrated as in Table 2 below, a new template T2=<CPU temperature, battery level> may be predefined. Further, a template corresponding to a trigger event may be defined: the trigger event for example is that the CPU utilization ratio of the remote device is always in a 100% state for a long time (for example, over 5 minutes), and the template for example is T3=<CPU temperature, frame temperature>. When the trigger event occurs, the state information is obtained by querying the CPU temperature and frame temperature of the remote device based on the template T3. The trigger event for example may also be periodic, for example, periodically querying the state of the remote device based on template T3 every 2 hours.

TABLE 2

| | State Information | |
|---|---|---|
| Number | Name | Numerical value |
| 1 | CPU temperature | 70° C. |
| 2 | Battery level | 30% |

It should be noted that the template at the remote device and the template at the remote management server should be kept consistent, for example, the template at the remote device may be periodically updated based on the template at the remote management server.

According to one embodiment of the present invention, obtaining the second identifier based on the numerical value sequence in the state information includes: forming the second identifier by encoding the numerical value sequence. The above only describes an example of forming the second identifier by simply connecting various items in the numerical value sequence. Other encoding manners may also be adopted to further compress a longer numerical value sequence to a form a shorter character string.

Specifically, three bits may be adopted to express CPU utilization ratio 100% and memory utilization ratio 29% in a binary system, such as "111" and "010," respectively, and one bit may be adopted to express the Boolean value False as "0." In the case that the lengths corresponding to respective numerical values are known, the various binary numbers may be connected into "1110100" without a separator. At this point, the second identifier is represented as the binary number "1110100," which may greatly shorten the length of the second identifier. Further, hexadecimal system may also be adopted to express the second identifier as "74"; even, "1110100" may be further expressed as a character "t" based on ASCII code table (the ASCII code of character t corresponds to the binary number "1110100"). Those skilled in the art may also adopt any other encoding manner to obtain the second identifier.

Figure 4:
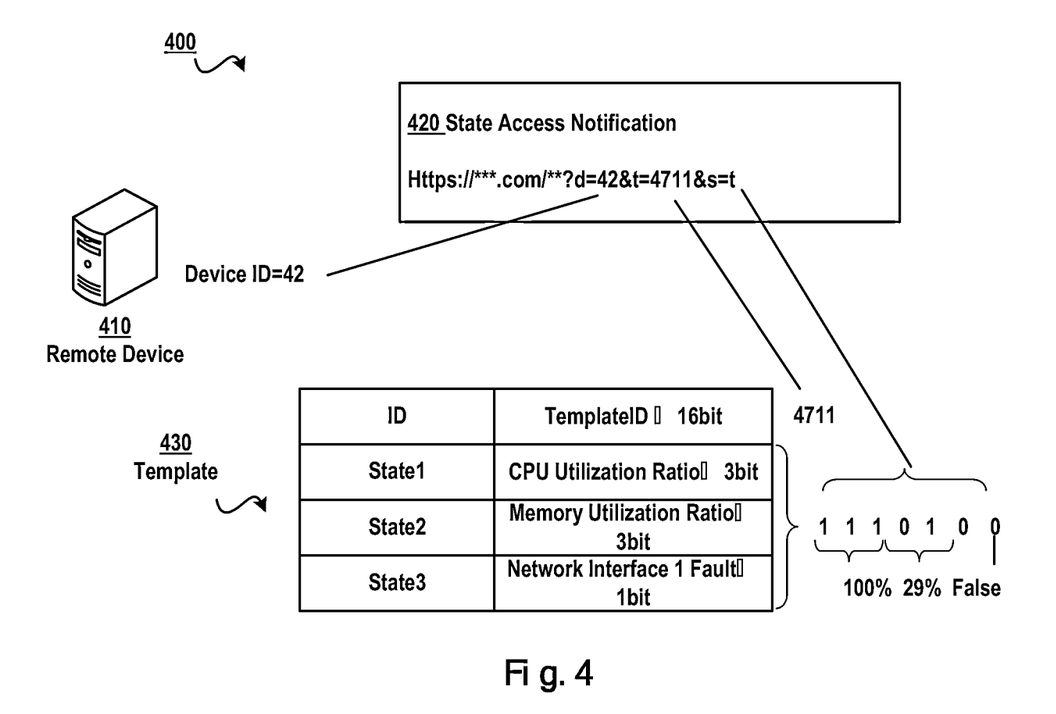
FIG. 4 illustrates a schematic diagram of a template according to an embodiment of the present invention.

Hereinafter, steps S302-S306 in FIG. 3 will be explained with reference to FIG. 4. FIG. 4 schematically illustrates a schematic diagram 400 of a template according to an embodiment of the present invention. FIG. 4 illustrates a remote device 410 with a device ID=42. In this embodiment, the state information of the remote device 410 is illustrated in the above table 1. By analyzing the state information as illustrated in Table 1, the state access notification 420 is generated. The state access notification 420 includes the following portions: a third identifier with "d=" as the prefix, indicating that the remote device ID is 42; a first identifier with "t=" as the prefix, indicating that the No. 4711 template is used; and a second identifier with "s=" as the prefix, indicating that the encoded result of the numerical value sequence in the state information is letter t. Template 430 defines the name sequence in the state information, i.e., comprising the name of each state, and the data length as used to describe the numerical value of the state. Table 3 below schematically illustrates a template.

TABLE 3

| | Template |
|---|---|
| ID | Template ID, 16 bit |
| State 1 | CPU utilization ratio, 3 bit |
| State 2 | Memory utilization ratio, 3 bit |
| State 3 | Network interface 1 Failure, 1 bit |

In one embodiment of the present invention, the state access notification is a unified resource identifier. For example, for the example in FIG. 4, the state access notification 420 may further comprise other characters, for example, after "Https://*.com/?" is connected in series with the following third, first, and second identifiers, a uniform resource identifier (URI) is formed. The state access notification may also further include the first, second and third identifiers, such that when the mobile terminal of the device administrator receives the state access notification, the URI prefix as locally stored in the mobile terminal may be joined with the content of the notification, such that the data traffic can be further reduced. By clicking on the URI, the device administrator may activate the state access notification 420, and then accesses the remote management server through web service to obtain the corresponding state information.

It should be noted that in order to further compress the length of the state access notification 420, other compression algorithms may also be used to compress the character string in the state access notification 420. After activating such further compressed state access notification, a corresponding decompression algorithm should be also performed.

In one embodiment of the present invention, sending state access notification is performed based on at least one of in-band communication and out-of-band communication. The remote device may support both in-band communication and out-of-band communication and may simultaneously use the two communication manners to perform remote device management, or may use the in-band communication when the in-band communication runs normally, while only using the out-of-band communication when the in-band communication fails. When the out-of-band communication is used, for example, the state access notification may be sent to the mobile terminal of the device administrator via SMS, MMS, or email.

It should be noted that in order to obtain the state information of the remote device at any time, a measurement value is generally obtained with a shorter time interval (for example, 0.5 s). When the state information is sent to the device administrator at this frequency, this causes a great data backup regardless of whether it is through the in-band communication or the out-of-band communication. In particular the out-of-band communication cannot handle that much data traffic. Therefore, in order to further compress the data amount of state access notification, pre-treatment of the measurement values can be performed at the remote device, and only the treated result is sent to the device administrator.

Another embodiment of the present invention further includes: acquiring the measurement values of the remote device based on the template, and performing pre-treatment to the measurement values at the remote device so as to generate state information. Acquiring the measurement values regarding the remote device based on the template refers to extracting which states of which remote device need to be acquired from the template. For example, the template illustrated in Table 3 above indicates that it needs to acquire the three states of the remote device with a device ID=42: "CPU utilization ratio," "memory utilization ratio," and "network interface 1 failure." The pretreatment may include, but is not limited to, the following content: (1) obtaining the average value of the measurement values during a certain period of time; (2) obtaining the maximum/minimum value among the measurement values during a certain period of time; (3) obtaining the standard deviation of the measurement values during a certain period of time; etc.

Figure 5A:
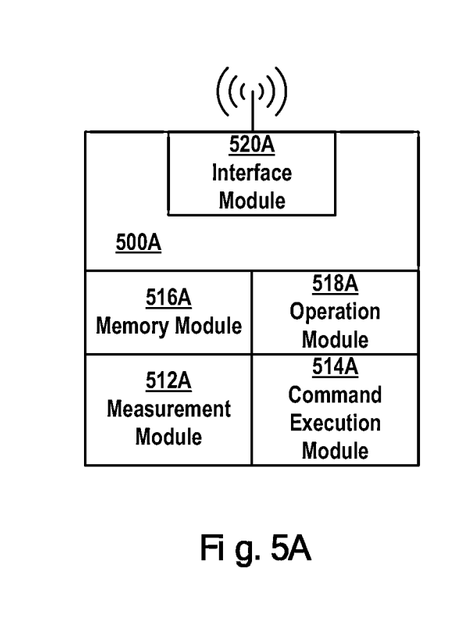
FIGS. 5A-5C illustrate schematic diagrams of remote devices according to an embodiment of the present invention, respectively.
Figure 5B:
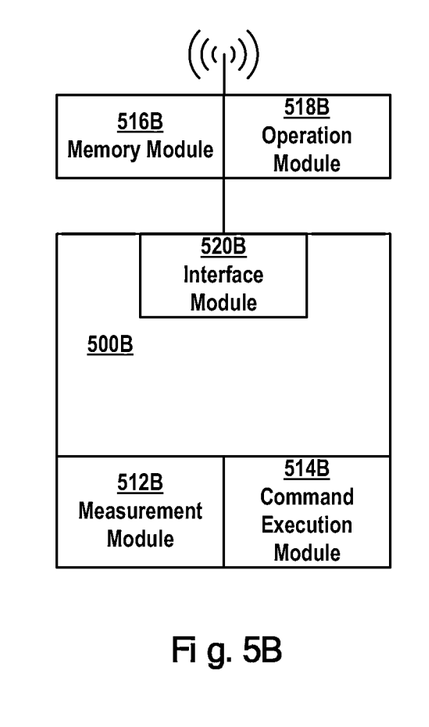
Figure 5C:
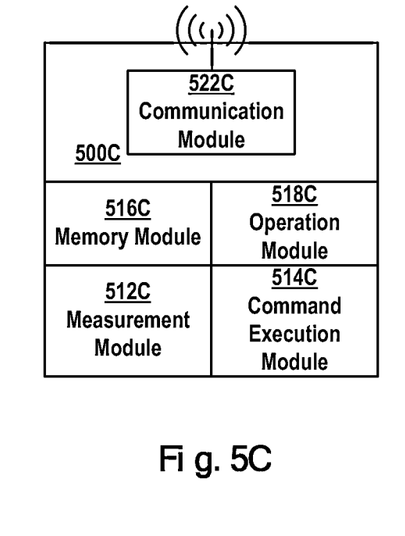

FIGS. 5A-5C illustrate schematic diagrams of remote devices 500A-500C according to an embodiment of the present invention, respectively. In FIG. 5A, the remote device 500A includes: a measurement module 512A configured to acquire original measurement values; a command execution module 514A configured to perform a basic pretreatment processing; a memory module 516A configured to store the original measurement values and the pre-treated result; an operation module 518A configured to perform a control operation; and an interface module 520 A configured to interconnect with other external devices, for example, it may be connected to a communication module that supports out-of-band communication.

The remote device may have different components, for example, the remote device might not include all of modules 512A-518A as illustrated in FIG. 5A, and the remote device may also be coupled to other modules via the interface module. For example, the remote device 500B in FIG. 5B is coupled via the interface module 520B to the memory module 516B, the operation module 518B, and the communication module that supports out-of-band communication. Or, as illustrated in FIG. 5C, the remote device 500C per se may further include a communication module 522C that supports out-of-band communication.

In one embodiment of the present invention, providing state information based on the first identifier and the second identifier in response to having received a result of activating the state access notification includes: generating a display view based on a template corresponding to the first identifier; parsing the second identifier to obtain a numerical value sequence, and inserting the numerical value sequence into the display view so as to provide state information.

As mentioned above, when the state access notification is URI, the state access notification may be activated simply by clicking on the URI. At this point, the remote management server would parse the content of the URI so as to extract the first, second, and third identifiers therefrom and to further provide corresponding state information based on the meanings of the respective identifiers. The process of extracting the first, second, and third identifiers is a reverse process of the above generating process. How to extract the identifiers will be illustrated with the state access notification "Https://*.com/?d=42&t=4711&s=t" as an example.

Because the remote management server knows the rules of generating a state access notification, the first, second, and third identifiers may be obtained through the prefixes "d=," "t=," and "s=."

First identifier: 4711, indicating that the template number is 4711;

Second identifier: t, indicating that the result of encoding the numerical value sequence is t; and Third identifier: 42, indicating that the device ID of the monitored object is 42.

In this embodiment, generating a display view based on the template corresponding to the first identifier refers to extracting the name sequence in the state information from the template and displaying the name of each state in sequence. For example, for the template illustrated in table 3, the initial display view as illustrated in table 4 may be generated.

TABLE 4

Initial Display View

CPU Utilization Ratio
Memory Utilization Ratio
Network Interface 1 Failure

It should be noted that the content in the data column in the right side of the display view is empty; it should be filled by the numerical value sequence obtained after parsing the second identifier. Because t is the result of encoding the numerical value sequence, it is also required to decode t. The ASCII codes illustrate that the binary sequence corresponding to t is 1110100, and it may be derived that the numerical value sequence represented by t is <100%, 29%, False> through the data format as defined in the No. 4711 template (as indicated by above table 3). Finally, the numerical value sequence is inserted into the right side blank column in the display view of table 4 to form the final display view as illustrated in table 5. It should be noted that the generating, parsing, and inserting steps in this embodiment are performed outside the mobile terminal, and what is provided to the mobile terminal is the final display view (as illustrated in table 5). For example, in the embodiment of expressing the state access notification with URI, the final display view may be provided in the manner of a web page.

TABLE 5

Final Display View

| CPU Utilization Ratio | 100% |
|---|---|
| Memory Utilization Ratio | 29% |
| Network Interface 1 Failure | False |

In one embodiment of the present invention, providing state information based on the first identifier and the second identifier in response to having received a result of activating the state access notification includes: attaching at least one of the following items to the display view: basic information, historical state information of the remote device, and a control command.

In one embodiment of the present invention, basic information of the monitored remote device may also be inserted into the final display view. For example, through the device ID=42, the device name, device type, device description, and other basic information may be obtained and displayed in the final display view. Through the device ID, the historical state information of the remote device may be obtained from the remote management server and attached to the end of the display view in the form of for example a list, a curve, etc. Further, the control command as executed for the monitored remote device may also be displayed. For example, when the CPU utilization ratio is 100% for a long period of time, and failure of the remote device is a possibility, a control command "Restart" may be displayed. In another example, when the CPU utilization ratio is 100%, a control command "Query Temperature" for querying the CPU temperature may be displayed to guarantee that the CPU is in a normal state.

Another embodiment of the present invention further includes: triggering a remote device to perform an action in response to having received a call control command. For example, when clicking on the control command "Restart," the remote device may be triggered to restart; when clicking on the "Query Temperature," the remote device may be triggered to display the CPU temperature information in the current web page or a new web page; or the statistical state "CPU Temperature" may be transferred to the user's mobile terminal via out-of-band communication in the form of the above state access notification.

Figure 6:
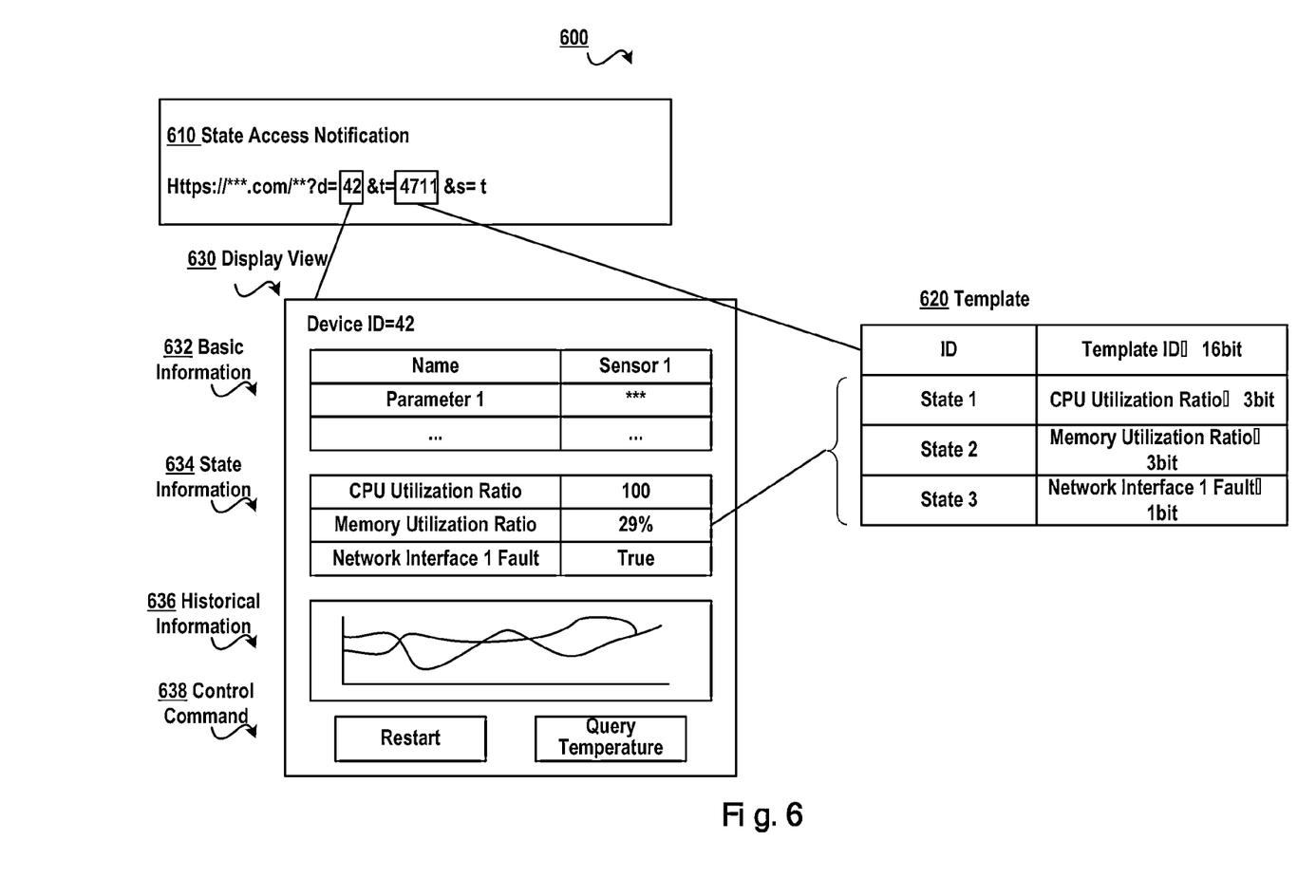
FIG. 6 illustrates a schematic diagram of a display view according to an embodiment of the present invention.

FIG. 6 illustrates a schematic diagram 600 of a display view according to an embodiment of the present invention. The reference sign 610 illustrates a state access notification "Https://*.com/?d=42&t=4711&s=t," wherein the template corresponding to the second identifier 4711 is illustrated by reference sign 620, and the display view as generated based on the template 620 is illustrated by reference sign 630. Basic information 632 may include various kinds of information of the device as obtained based on the device ID=42; the state names in the left column of the state information 634 are obtained based on the template 620 corresponding to the second identifier, while the numerical values in the right column of the state information 634 are obtained through parsing the third identifier t. The display view 630 may also comprise historical information 636 and a control command 638.

The above method of managing a remote device is applicable to both in-band communication and out-of-band communication, and particularly suitable for out-of-band communication with an extremely limited transfer data amount. Those skilled in the art may refer to the above method to construct an embodiment suitable for bandwidth of in-band communication by adopting other data structures.

For example, the following data structure may be customized by adopting the Java Script Object Notation JSON format in the in-band communication, and a similar data structure may also be implemented using XML.

| Message Example: illustrateMetric |
|---|
| Request to remote management device:<br>{<br>  "SOURCE":"MS",<br>  "DEST":"pa001",<br>  "BODY":{<br>    "id":123,<br>    "module_id":"wma001",<br>    "action":"illustrateMetric",<br>    "content":{<br>      "element_id":"mem",<br>      "metric":"MemUtil"<br>    }<br>  }<br>}<br>Response from remote management device:<br>{<br>  "SOURCE":"pa001",<br>  "DEST":"MS",<br>  "BODY":{<br>    "id":5,<br>    "ref":123,<br>    "module_id":"wma001",<br>    "action":"illustrateMetric_res",<br>    "status":200,<br>    "content":[<br>      {<br>        "element_id":"mem",<br>        "metric_id":"MemUtil",<br>        "name":"Memory utilization",<br>        "unit":"kB",<br>        "base":"1024",<br>        "min":"0.000000",<br>        "max":"3985052.000000",<br>        "info":"Memory utilization.",<br>        "enabled":"yes"<br>      }<br>    ]<br>  }<br>} |

The above context schematically illustrates how to manage a remote device based on a state access message. Those skilled in the art may design other embodiments in combination with specific application demands: for example, a timestamp may be added into the state access notification so as to avoid confusion caused by delay or retransmission; the state access notification may be sent or failure diagnosis help may be provided to the device administrator when a particular condition occurs.

Figure 7:
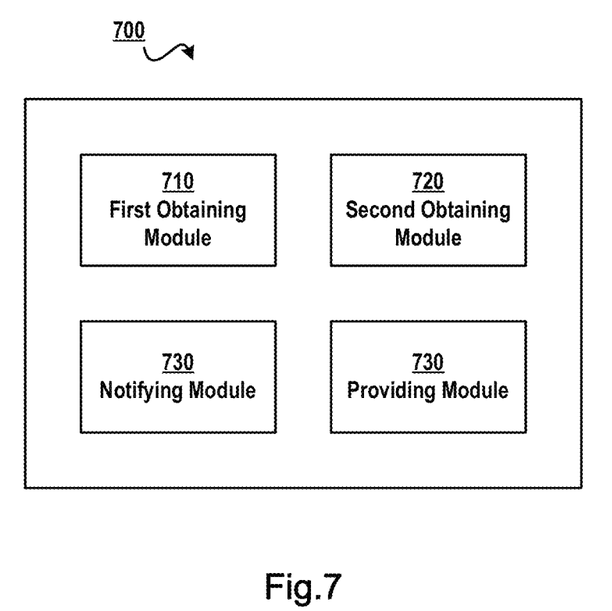
FIG. 7 schematically illustrates a block diagram of an apparatus for managing a remote device according to an embodiment of the present invention.

FIG. 7 schematically illustrates a block diagram 700 of an apparatus for managing a remote device according to an embodiment of the present invention. In this embodiment, there is an apparatus for managing a remote device, including: a first obtaining module 710 configured to obtain a first identifier based on a name sequence in state information of the remote device, the first identifier used to indicatea template that provides the state information; a second obtaining module 720 configured to obtain a second identifier based on a numerical value sequence in the state information; a notifying module 730 configured to send a state access notification that includes at least the first identifier and the second identifier; and a providing module 740 configured to provide the state information based on the first identifier and the second identifier in response to having received a result of activating the state access notification.

In one embodiment of the present invention, the first obtaining module 710 includes: a selecting module configured to select a template corresponding to the name sequence; and a setting module configured to set the first identifier as an identifier of the template.

In one embodiment of the present invention, the second obtaining module 720 includes: an encoding module configured to form the second identifier by encoding the numerical value sequence.

In one embodiment of the present invention, the providing module 740 includes: a generating module configured to generate a display view based on a template corresponding to the first identifier; a parsing module configured to parse the second identifier to obtain the numerical value sequence; and an inserting module configured to insert the numerical value sequence into the display view to provide state information.

In one embodiment of the present invention, the providing module 740 further comprises an attaching module configured to attach at least one of the following items to the display view: basic information, historical state information of the remote device, and a control command.

Another embodiment of the present invention further includes: a control attaching module configured to attach a control command to the display view; and a triggering module configured to trigger the remote device to perform an action in response to having received a user call control command.

Another embodiment of the present invention further includes: an acquiring module configured to acquire the measurement values of the remote device, and a pretreatment module configured to perform pre-treatment to the measurement values at the remote device so as to generate state information.

In one embodiment of the present invention, the state access notification is a unified resource indicator.

In one embodiment of the present invention, the notifying module 730 includes at least one of an in-band communication module and an out-of-band communication module.

In one embodiment of the present invention, the state access notification further includes: a third identifier for indicating device identification of the remote device.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of managing a remote device, comprising:
in a processing device of a server communicatively coupled to the remote device:
obtaining a first identifier which corresponds to a name sequence in state information of the remote device, the first identifier being mapped to a template that provides the state information;
obtaining a second identifier which corresponds to a numerical value sequence in the state information;
sending a state access notification that comprises at least the first identifier and the second identifier; and
providing the state information based on the first identifier and the second identifier in response to having received a result of activating the state access notification, the providing of the state information comprising:
constructing the state information using the template which is mapped to the first identifier, and the numerical value sequence which corresponds to the second identifier,
wherein the state access notification comprises a uniform resource identifier (URI) which includes the first and second identifiers, and the activating of the state access notification comprises a user activating the state access notification by clicking on the URI.

2. The method according to claim 1, wherein the constructing of the state information comprises:
generating a display view based on the template corresponding to the first identifier;
parsing the second identifier to obtain the numerical value sequence; and
inserting the numerical value sequence into the display view to provide the state information.

3. The method according to claim 2, wherein providing the state information based on the first identifier and the second identifier further comprises:
attaching at least one of the following items to the display view: basic information, historical state information of the remote device, and a control command.

4. The method according to claim 2, further comprising:
attaching a control command to the display view; and
triggering the remote device to perform an action in response to having received calling the control command.

5. The method according to claim 1, further comprising:
acquiring measurement values of the remote device based on the template; and
performing pretreatment to the measurement values at the remote device so as to generate the state information.

6. The method according to claim 1, wherein the state access notification further comprises: a third identifier for indicating device identification of the remote device.

7. An apparatus for managing a remote device, comprising:
a server communicatively coupled to the remote device, the server comprising:
a processing device which executes instructions to perform a function of:
a first obtaining module which obtains a first identifier which corresponds to a name sequence in state information of the remote device, the first identifier being mapped to a template that provides the state information;
a second obtaining module which obtains a second identifier which corresponds to a numerical value sequence in the state information;
a notifying module which sends a state access notification that comprises at least the first identifier and the second identifier; and
a providing module which provides the state information based on the first identifier and the second identifier in response to having received a result of activating the state access notification, the providing module providing the state information by constructing the state information using the template which is mapped to the first identifier, and the numerical value sequence which corresponds to the second identifier,
wherein the state access notification comprises a uniform resource identifier (URI) which includes the first and second identifiers, and the activating of the state access notification comprises a user activating the state access notification by clicking on the URI.

8. The apparatus according to claim 7, wherein the providing module comprises:
a generating module which generates a display view based on the template corresponding to the first identifier;
a parsing module which parses the second identifier to obtain the numerical value sequence; and
an inserting module which inserts the numerical value sequence into the display view to provide the state information.

9. The apparatus according to claim 8, wherein the providing module further comprises:
an attaching module which attaches at least one of the following items to the display view: basic information, historical state information of the remote device, and a control command.

10. The apparatus according to claim 8, wherein the processing device further executes instructions to perform a function of:
a control attaching module which attaches a control command to the display view; and
a triggering module which triggers the remote device to perform an action in response to having received calling the control command.

11. The apparatus according to claim 7, wherein the processor device further executes instructions to perform a function of:
an acquiring module which acquires measurement values of the remote device based on the template; and
a pretreatment module which performs pretreatment to the measurement values at the remote device so as to generate the state information.

12. The apparatus according to claim 7, wherein the state access notification further comprises: a third identifier for indicating device identification of the remote device.

13. A non-transitory computer readable article of manufacture tangibly embodying computer readable instructions which, when executed, cause a computer to carry out the steps of a method of managing a remote device comprising:
in a processing device of a server communicatively coupled to the remote device:
obtaining a first identifier which corresponds to a name sequence in state information of the remote device, the first identifier being mapped to a template that provides the state information;

obtaining a second identifier which corresponds to a numerical value sequence in the state information;

sending a state access notification that comprises at least the first identifier and the second identifier; and providing the state information based on the first identifier and the second identifier in response to having received a result of activating the state access notification, the providing of the state information comprising:

constructing the state information using the template which is mapped to the first identifier, and the numerical value sequence which corresponds to the second identifier, wherein the state access notification comprises a uniform resource identifier (URI) which includes the first and second identifiers, and the activating of the state access notification comprises a user activating the state access notification by clicking on the URI.

14. The method of claim 1, wherein the obtaining of the first identifier comprises:

selecting the template corresponding to the name sequence; and setting the first identifier as an identifier of the template.

15. The method of claim 1, further comprising:

storing in the server and the remote device, a mapping of a plurality of first identifiers to a plurality of templates of name sequences, respectively.

\* \* \* \* \*